United States Patent
Dahbour et al.

(10) Patent No.: US 10,467,219 B2
(45) Date of Patent: Nov. 5, 2019

(54) EXPORTING SUBSET OF A DATABASE

(71) Applicant: Informatica LLC, Redwood City, CA (US)

(72) Inventors: Ziyad Dahbour, San Mateo, CA (US); Subhakara Babu Maguluri, Hyderabad (IN)

(73) Assignee: Informatica LLC, Redwood City, CA (US)

(*) Notice: Subject to any disclaimer, the term of this patent is extended or adjusted under 35 U.S.C. 154(b) by 884 days.

(21) Appl. No.: 14/706,390

(22) Filed: May 7, 2015

(65) Prior Publication Data

US 2016/0019276 A1 Jan. 21, 2016

(30) Foreign Application Priority Data

Jul. 15, 2014 (IN) .......................... 3486/CHE/2014

(51) Int. Cl.
*G06F 16/22* (2019.01)

(52) U.S. Cl.
CPC ................ *G06F 16/2282* (2019.01)

(58) Field of Classification Search
CPC ................ G06F 17/30339; G06F 16/2282
USPC .......................................................... 707/626
See application file for complete search history.

(56) References Cited

U.S. PATENT DOCUMENTS

| 7,548,898 B1 | 6/2009 | Tarenskeen et al. |
| 2009/0063398 A1* | 3/2009 | Bhatia ............... G06F 17/30536 |
| 2009/0138467 A1 | 5/2009 | Hunur et al. |
| 2009/0182706 A1* | 7/2009 | Olston .............. G06F 17/30442 |
| 2013/0110770 A1 | 5/2013 | Stevelinck |
| 2013/0262387 A1 | 10/2013 | Varadharajan et al. |
| 2014/0280024 A1* | 9/2014 | Baskett ............. G06F 17/30498 707/714 |

FOREIGN PATENT DOCUMENTS

GB 2507094 A 4/2014

OTHER PUBLICATIONS

Informatica White Paper: Test Data Management for Security and Compliance, Jun. 2013, 12 pages.
EMC[2] White Paper: 70 TB of Disk Savings in 4 Days: EMC IT's Informatica Data Subset Proof of Concept, Apr. 2011, 22 pages.
European Extended Search Report, European Application No. 15176263.0, dated Dec. 3, 2015, 11 pages.

* cited by examiner

*Primary Examiner* — Jensen Hu
(74) *Attorney, Agent, or Firm* — Amardeep S. Grewal; Reed Smith LLP

(57) ABSTRACT

A system and a method are disclosed for exporting a subset of a database from a source system to a target system. The database system identifies a first set of tables and determines the subset of data for these tables for transfer by executing one or more database queries. For example, the first set of tables is selected based on their sizes. The database system identifies a second set of tables for transferring by performing a file copy operation. For example, the remaining set of tables other than the first set of tables is transferred by performing a file copy operation. The database system moves the tables of the first set to a new table space for separating the files storing the first set of tables from the files storing the second set of tables.

20 Claims, 3 Drawing Sheets

EXPORTING SUBSET OF A DATABASE

CROSS REFERENCE TO RELATED APPLICATIONS

This application claims the benefit of Indian Provisional Patent application serial no. 3486/CHE/2014, filed Jul. 15, 2014, which is incorporated by reference in its entirety.

BACKGROUND

Field of Art

This disclosure relates to exporting data from a database system in general and in particular to specific methods and system for exporting a subset of data stored on a database system to another database system.

Description of the Related Art

Enterprises use databases to store information related to the enterprise, for example, information describing products, sales, inventory, employees, and so on. A database storing information of an enterprise can be complex. For example, a relational database for a typical enterprise can represent several thousand database objects including database tables, indexes, views, and so on, as well as relations between these database objects. Furthermore, the amount of data stored in databases for certain enterprises can be large. For example, a database may store information describing transactions executed by an enterprise. An enterprise may execute hundreds of thousands of transactions every day. Over a period of several months or years, the amount of information stored in the database can grow to a very large size. It is not uncommon for databases to store tens, or even hundreds of millions of records. Managing large and complex databases consumes significant computational resources. For example, performing typical database operations such as backup, replication, and so on may require significant hardware resources.

One operation often performed using production databases is exporting the data of the production system. For example, data from production databases is exported for testing and debugging issues. Testing and debugging often requires operations that are disruptive for a production system, for example, shutting down the system, restarting the system, running test loads, executing code that is not fully tested, and so on. Since production systems typically need to be available for continuous use, database administrators avoid testing and debugging a live production system. However, a system similar in configuration to the production system is required to reproduce the problems observed in the production system.

Therefore, system administrators typically make a copy of the production database for testing and debugging. However, making a copy of a large and complex production database can require significant amount of time and computing resources. Some system administrators reduce the amount of data copied to the test system by exporting a subset of data relevant for purposes of testing and debugging. However, determining a subset of data of a large and complex production database requires executing database queries and commands on the production database and can itself be a resource consuming task. Furthermore, these database queries are executed on a production system and slow down the production system. Therefore, conventional techniques for making a copy of the production database or a copying a subset of the production database to another system often are inadequate.

SUMMARY

The described embodiments are various methods and systems that export data of a database from a source system to a target system. The source system receives a request to export a subset of data stored in a source database to a target system. The request specifies a criterion for determining the subset of the data. The source system divides the tables of the database into two non-overlapping sets, a first set including N of the largest tables of the database (where N is a predetermined number) and a second set including the remaining smaller tables of the database. The size of a table is determined based on the amount of data stored in the table (e.g., number of bytes of data stored in the table). The source system exports the second set of tables by copying the files storing the second set of tables from the source system to the target system. This transfers the entire data stored in the tables of the second set to the target system. A target database is initialized on the target system using the data of the second set of tables transferred by the file copy operation. The source system executes database queries on the source database to determine the requested subset of data of the first set of tables. The source system transmits the determined subset of data to the target database of the target system. Typically a database includes a few large tables and a large number of small tables. As a result, the method disclosed executes only a few queries compared to techniques that determine a subset of all the tables of the database. Furthermore, performing a copy operation to transfer the entire data of the smaller tables is more efficient than executing a large number of database queries to determine the subset of data of these tables.

In some embodiments, the source system divides the tables of the database into two sets based on criteria other than the sizes of the tables. For example, the source system may receive a selection of tables to be included in the first set from a system administrator. The source system includes the remaining tables in the second set.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
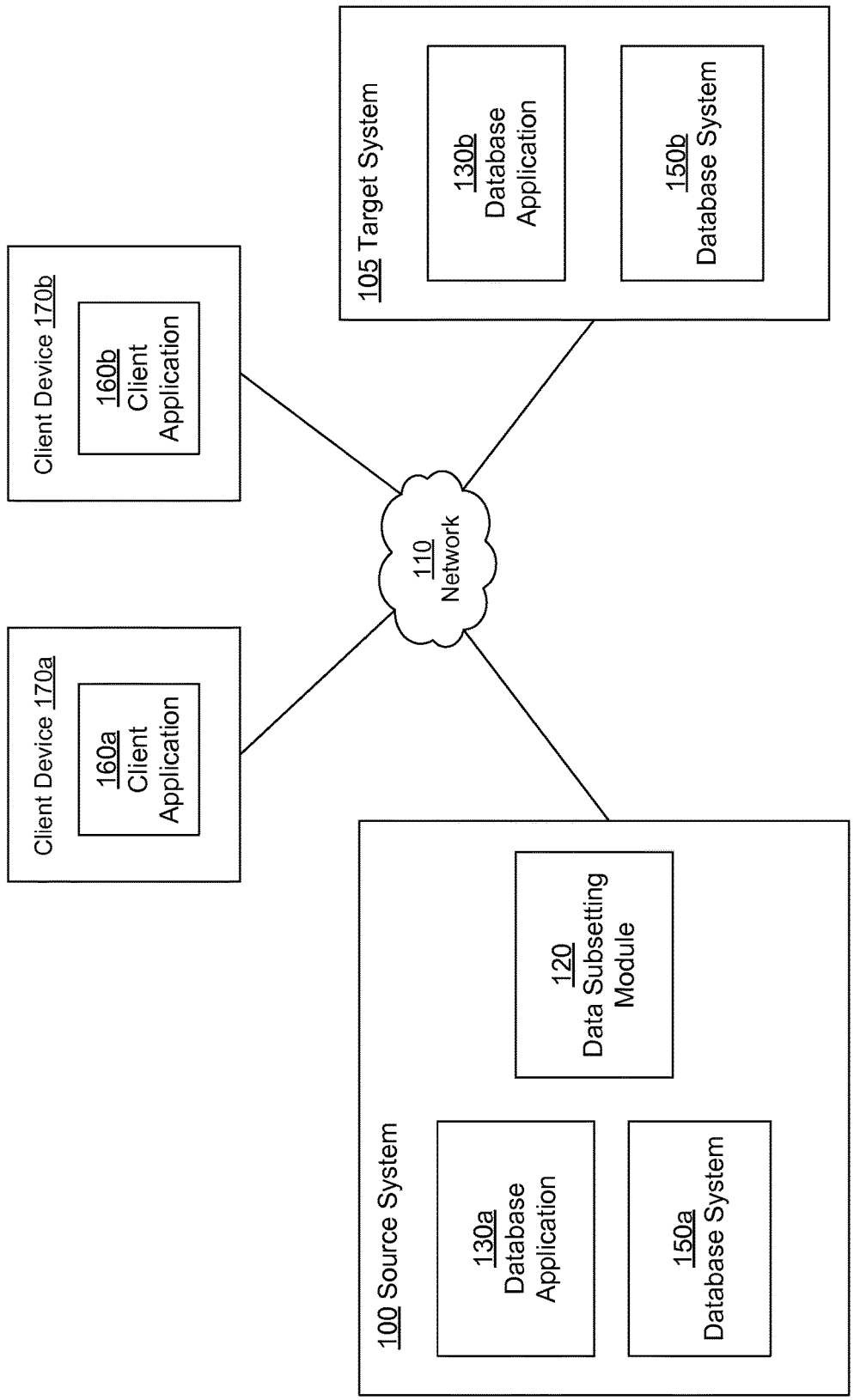
FIG. 1 shows the overall system environment for exporting a subset of data of a database from a source system to a target system, according to an embodiment.

FIG. 1 shows the overall system environment for exporting a subset of data of a database from a source system to a target system, according to an embodiment. The overall system environment includes a source system 100, a target system 105, client devices 170a and 170b, and a network 110. In an embodiment, the source system 100 is a system used in a production environment and the target system 105 is a system used in a test or debugging environment. In other embodiments, more or less components than those indicated in FIG. 1 may be used. Furthermore, functionality described herein may be implemented by modules other than those indicated herein. (A letter after a reference numeral, such as "170a," indicates that the text refers specifically to the element having that particular reference numeral, while a reference numeral in the text without a following letter, such as "170," refers to any or all of the elements in the figures bearing that reference numeral.)

The source system 100 and the target system 105 receive user requests via a client device 170. The source system performs various operations in response to the user requests, for example, the source system may retrieve data from the database system 150, perform updates to the database system 150, send commands for execution by the database system 150, or send commands for execution by other software executing on these systems, for example, the operating system. The client device 170 includes a client application 160 that comprises a user interface configured to allow user interactions with the source system 100 or the target system 105. The client application 160 may be an internet browser, or a proprietary application developed for interacting with source system 100 and target system 105.

The source system 100 and target system 105 include an operating system, for example, a UNIX operating system, LINUX operating system, or a WINDOWS operating system. The operating system manages the hardware resources of the source system 100 and target system 105 and also provides various services, for example, process management, input/output of data, management of peripheral devices, and so on. The operating system provides various functions for managing files stored on a device, for example, creating a new file, moving or copying files, transferring files to a remote system, and so on.

The client device 170 can be a conventional computer system (e.g., a desktop or laptop computer), a tablet, or a device having computer functionality such as a personal digital assistant (PDA), a mobile telephone, a smart phone or another suitable device. Client device 170 interacts with source system 100 or target system 105 via network 110. Network 110, may comprise any combination of local area and/or wide area networks, using both wired and/or wireless communication systems. In one embodiment, the network 110 uses standard communications technologies and/or protocols.

The source system 100 may be used in a production environment of an enterprise although techniques disclosed herein apply to other types of environments, for example, standby systems or development systems. A source system 100 used in a production environment receives requests to read or update information from client devices 170. For example, if the source system 100 is used in an enterprise that sells products, the source system 100 receives requests for information about products from potential customers or requests to update sales information based on sales transactions completed.

The source system 100 and target system 105 are hosted on computing systems that include one or more processors, memory, secondary storage and input/output controller. The computing system used for hosting the source system 100 is typically a server class system that uses powerful processors, large memory, and fast input/output systems compared to a typical computing system used, for example, as a client device. The server typically has large secondary storage, for example, using a RAID (redundant array of independent disks) array. The target system 105 is typically used for testing and debugging and can be a less powerful system compared to the source system 100. For example, the target system 105 may have fewer processors and less memory compared to the source system.

The source system 100 includes a database system 150, a database application 130, and a data subsetting module 120. In other embodiments, the source system 100 may include more, less, or different components than those indicated in FIG. 1. Furthermore, some of the components shown as part of source system 100 may be included in other systems. The target system 105 before execution of the export process (for example, the process described in FIG. 3) is without the database system 150b and the database application 130b. However, as a result of the export process, the target system 105 receives the data and executable code for the database system 150b and the database application 130b.

The database system 150 manages data and provides access to data, for example, read or write access. The database system 150 may represent structured data, unstructured data, or semi-structured data. For example, database system 150 may represent structured data comprising relational tables. The database system 150 may represent constraints on database tables and relations between tables, for example, primary keys and foreign keys. The database system 150 typically provides an interface for interacting with the data stored in the database system 150. For example, database system 150 may support structured query language (SQL) for specifying instructions to manage database objects represented by the database system 150, read information from the database system 150, or write to the database system 150.

A user of the database can be an application, for example, database application 130. The database application 130 is typically implemented using a programming language, for example, C, C++, or Java. The database application 130 may be provided by a vendor separate from the vendor providing the database system 150 and may be packaged separately. For example, the database application 130 may configure user interfaces for display by a client application 160 and send information representing the user interfaces to the client application 160 via the network 110.

A database application 130 typically provides features that are not provided by the database system 150. For example, the database application 130 may support a shopping cart for making purchases, a workflow for allowing checkout of shopping cart, and so on. Other examples of database application 130 include customer relationship management (CRM) applications used by enterprises, workflow management applications, data mining applications, and so on. The database application 130 may interact with systems other than database system 150, for example, a financial system to execute credit card transactions.

The database application 130 also comprises files stored on a storage device of the source system 100. These include the executable files of the database application 130, configuration files, and files storing data outside the database system 150. For example, the database application 130 may store documents, images, media files, and so on, outside the database system 150.

The data subsetting module 120 allows efficient transfer of a subset of data stored in database system 150*a* of the source system 100 to the target system 105. The details of the data subsetting module 120 are further described herein, for example, in FIG. 2. The process used by the data subsetting module 120 to transfer the subset of data is illustrated in FIG. 3 and described herein.

System Architecture

Figure 2:
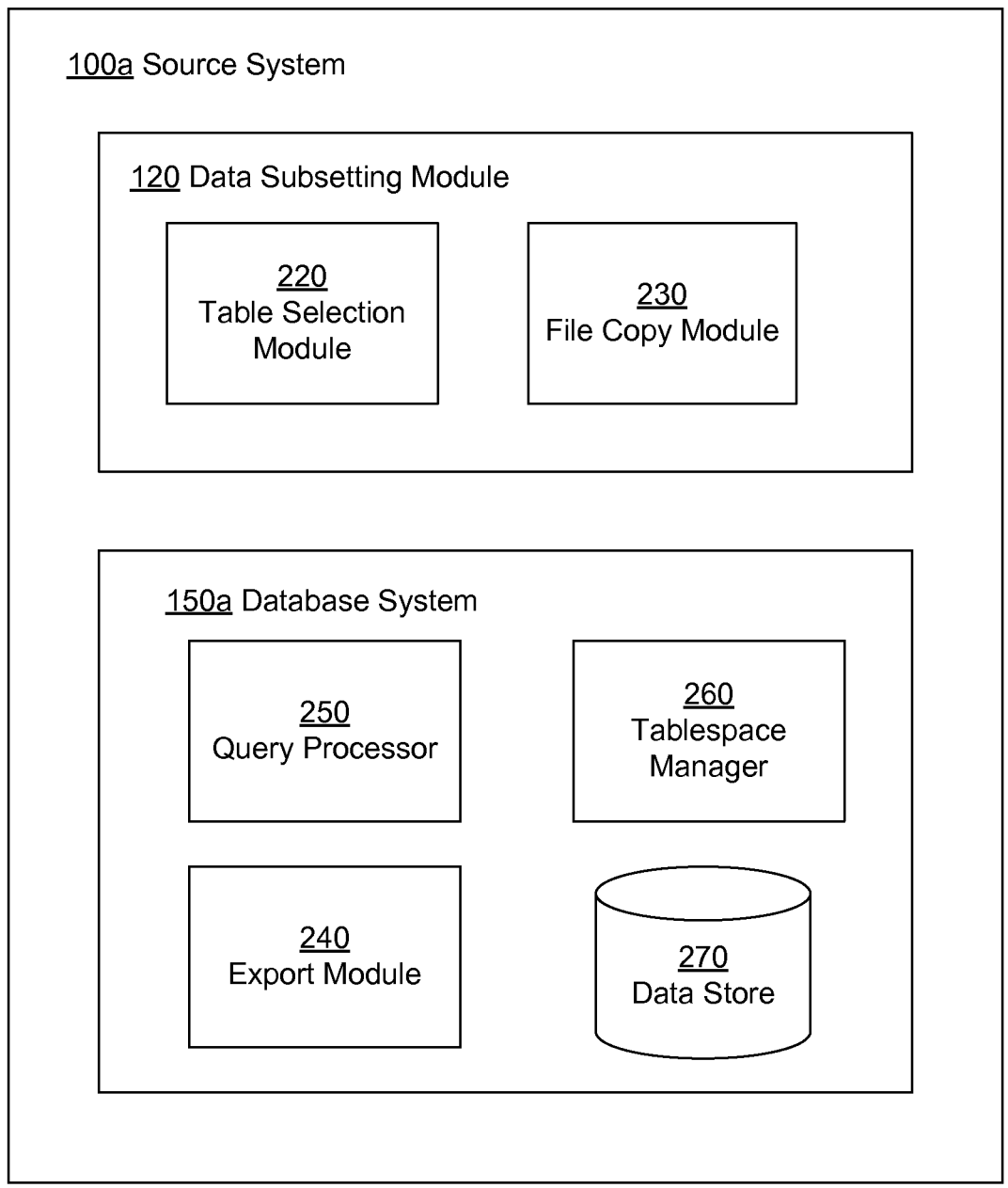
FIG. 2 shows the system architecture illustrating various modules of a source system for exporting a subset of data of a database, according to an embodiment.
Figure 3:
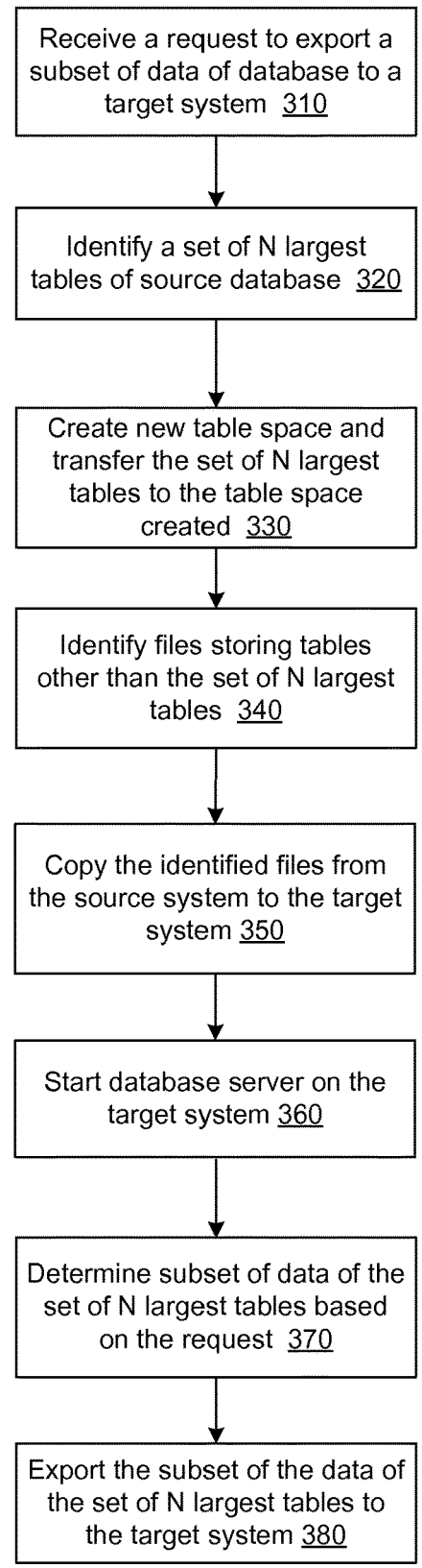
FIG. 3 shows a flowchart illustrating the process for exporting a subset of data of a database, in accordance with an embodiment of the invention.

FIG. 2 shows the system architecture illustrating modules of a source system for exporting a subset of data of a database, according to an embodiment. FIG. 2 shows details of the source system 100, including the data subsetting module 120 and the database system 150*a* that are shown in FIG. 1. The data subsetting module 120 includes a table selection module 220 and a file copy module 230. The database system 150 includes a query processor 250, a tablespace manager 260, an export module 240, and a data store 270. In other embodiments, source system 100 may include other modules not shown in FIG. 2, for example, the database application 130 shown in FIG. 1. Furthermore, the functionality described herein may be performed by modules other than those indicated herein.

The data store 270 stores the data and the metadata of the database system 150, and is one means for doing so. The data stored in the data store 270 includes the various database objects, for example, tables, indexes, and so on. The data of the data store 270 is stored as files of the underlying operating system.

The database system 150 provides an abstraction that hides the details of how the data is stored in the data store 270 and allows users to manipulate the data in the form of database objects. For example, the user interfaces and application programming interfaces of the database system 150 typically do not provide information regarding the number of files used to store the data of the database system 150, the names of the files, the layout of data within each file, and so on.

The data subsetting module 120 is configured to transfer a subset of data of the database system 150 to a target system 105, and is one means for doing so. The data subsetting module 120 receives a request to transfer a subset of the data of the database system 150. The data subsetting module 120 can transfer data by two different ways. The data subsetting module 120 can determine the requested subset of data for the first set of tables by executing database queries and transfer the subset of data to the target system 105. Alternatively, the data subsetting module 120 can invoke the file copy module 230 to transfer one or more tables by performing a file transfer operation on files that store the data of the tables.

The table selection module 220 divides the tables of the database into two sets, a first set of tables and a second set of tables, and is one means for doing so. The table selection module 220 determines the number of tables that go in each set based on various criteria discussed below. For example, the table selection modules 220 selects the largest tables of the database system 150*a* as the first set of tables and the remaining smaller tables as the second set of tables.

In an embodiment, the table selection module 220 is configured to select the set of N largest tables of the database system 150. The table selection module 220 may determine the value of N based on various criteria. For example, table selection module 220 may determine the value of N as a fixed percentage of the total number of tables of the source database, say 10%. Alternatively, the value of N may be a fixed value, for example, top 10 largest tables. The table selection module 220 may determine the value of N based on the amount of data (e.g., total number of bytes) stored in the set of selected tables. For example, the table selection module 220 may rank the tables in decreasing order of the number of bytes of data stored in each table. The table selection module 220 includes the tables in decreasing order of sizes in the set of tables so long as the total amount of data of the set of tables is below a threshold value. In some embodiments, the table selection module 220 uses the number of rows on each table as a measure of size of each table. The number of bytes stored in a table is a more accurate measure of the size of the table although determining the number of rows of a table is computationally less intensive.

As an example, assume that the database stores statistics describing tables in a metadata table called table_stats. The table table_stats includes a column table_name storing names of tables of the database and a column table_size storing the size of each table. The information of the table_stats table may be updated by executing a database command to determine the latest statistics of database objects stored in the database. Assume that the table selection module 220 determines a THRESHOLD value of size such that all tables larger than THRESHOLD value are considered large tables. The table selection module 220 executes the following query to identify all tables larger than THRESHOLD size:

SELECT table_name FROM table_stats WHERE table_size>THRESHOLD

Databases provided by certain vendors support queries that identify top few rows returned by a query, for example, by specifying a keyword TOP and providing a number or a percentage value after the keyword (say, TOP 100 or TOP 10%). Accordingly, the table selection module 220 executes the following query to identify 10% of the largest tables of the database.

```
SELECT TOP 10% FROM (
    SELECT table_name
        FROM table_stats
        ORDER BY table_size DESC
)
```

In the above query, the inner query orders the tables of the database in descending order of their sizes. The outer query selects the top 10% of results of the inner query, i.e., the top 10% of the largest tables of the database. If the database does not support queries that can identify TOP rows of a result set, the top rows may be determined by executing a separate query to determine the size of the table table_stats and determining the 10% value of the result.

In some embodiments, the table selection module 220 divides the tables of the database into two sets based on their significance. The table selection module 220 may determine significance of a table based on how frequently the data stored in the table is accessed or updated. The table selection module 220 may receive a measure of significance of tables from a system administrator. In some embodiments, the table selection module 220 combines various criteria for selecting the set of tables, for example, some of the tables may be selected based on their sizes whereas other tables may be selected based on their significance. Typically, the number of tables in the identified set of tables is small compared to the remaining tables of the database system 150. However, the amount of data stored in the identified set of tables can be significantly larger than the data stored in the remaining tables of the database system 150.

In some embodiments, the table selection module 220 receives a selection of tables for inclusion in the first set of tables or the second set of tables. The table selection module 220 receives the selection of tables from a user, for example, from a database administrator via the client application 160.

In other embodiments, the table selection module 220 ranks the tables based on a combination of criteria. For example, the table selection module 220 selects a subset of the tables based on significance and the remaining tables based on the sizes of the tables. Alternatively, the table selection module 220 selects the set of tables based on a weighted aggregate of multiple criteria. Once the table selection module 220 determines a first set of tables based on a ranking, the table selection module 220 determines a second set comprising the remaining tables that are not included in the first set The query processor 250 receives database queries and processes them, and is one means for doing so. In an embodiment, query processor 250 receives the database queries specified using a standard syntax, for example, SQL syntax. The query processor 250 performs various steps in processing a database query including, parsing of the database query, building a graph or a tree structure representing the database query, rewriting the database query, optimizing the database query to improve its performance, generating code from the database query, and executing the generated code. The data subsetting module 120 invokes the query processor 250 to execute queries used to determine subsets of data stored in certain tables.

The file copy module 230 transfers data of database system 150 from source system 100 to target system 105 by copying files storing the data on the source system 100 to the target system 105, and is one means for doing so. In an embodiment, the file copy module 230 uses file copy operations supported by the operating system executing on the source system 100. The data subsetting module 120 invokes the file copy module by providing a set of files and requests the file copy module 230 to transfer the set of files to the target system 105.

The file copy module 230 transfers data from source system to the target system transfer without executing database queries of the database system 150. Accordingly, transfer of data using the file copy module 230 does not incur the overhead of processing database queries, for example, the overhead of parsing the database queries, optimizing the queries, performing code generation, and so on. As a result, for small tables that store less than a threshold amount of data, transferring the data by file copying is more efficient than executing a database query to process the data.

However, since the file copy module 230 transfers the entire file storing the data without analyzing the data stored in the file, the file copy module 230 may transfer more data than specified in the request to transfer a subset of data stored in the tables. If the table sizes are small, transferring a small table by copying files is more efficient even if the file copy module 230 transfers more data than requested. This is so because the overhead of transferring the additional data is less than the overhead of executing a database query using the database system 150.

The tablespace manager 260 manages tablespaces of the database system 150, and is one means for doing so. A tablespace is a container of database objects that comprises one or more files storing the data of the contained database objects. The tablespace manager 260 stores each tablespace as one or more files on a device of the source system 100 or target system 105. The database system 150 associates each table of the database with a tablespace. For example, if multiple tables of the database system 150 are assigned to the same tablespace, these tables are stored on the file or set of files associated with the tablespace.

The database system 150 supports commands to assign a table to a tablespace or to move a table from a source tablespace to a target tablespace. As a result, the tablespace manager 260 moves the data of the table from a file of the source tablespace to a file of the target tablespace. The data subsetting module 120 invokes the tablespace manager 260 to store data of a set of tables is a particular file or set of files. This allows the data subsetting module 120 to move the data of the tables to specific files so that the file copy module 230 can be invoked to transfer the data by copying these files from the source system to the target system.

The export module 240 exports data of source system 100 to target system 105 in response to requests to transfer the data, and is one means for doing so. In an embodiment, the export module 240 receives a request to export data specifying certain criteria that needs to be satisfied by the data to be exported. The criteria may be specified as database queries that determine a subset of data of the database.

As an example, assume that a database system 150 includes a table that stores all transactions of an enterprise. Also, assume that the table storing transactions includes a timestamp associated with each transaction. Furthermore, a system administrator needs to set up a test system for testing an issue that occurred in transactions from a particular month. The database administrator may specify a database query to select transactions of that particular month and export the data to a test system.

The export module 240 determines the subset of data for exporting by invoking the query processor 250 for executing the database queries specified. The export module 240 transfers the subset of data to a database system 150*b* on target system 105. The export module 240 creates a connection with a database system 150*b* on target system 105 to transfer the data to the target system 105. Accordingly, the database system 150*b* on target system 105 must be running to enable the export module 240 to create a connection and perform the data transfer.

Process of Exporting a Subset of Data

FIG. 3 shows a flowchart illustrating the process of exporting a subset of data of a database, in accordance with an embodiment of the invention. Certain steps of the process illustrated in FIG. 3 may be executed in an order different from the order shown in FIG. 3. Certain steps of the process shown in FIG. 3 may be executed in parallel with other steps. Furthermore, steps may be executed by modules other than those indicated herein.

The data subsetting module 120 receives 310 a request to export a subset of data stored in the database system 150 from the source system 100 to the target system 105. The data subsetting module 120 receives as part of the request, specification of criteria to determine a subset of the data stored in the database system 150. The criteria are specified as a set of database queries that compute a subset of the data stored in the database system 150. For example, a database query may identify a subset of records stored in a table and/or may select a subset of columns from the table. The data subsetting module 120 may receive the criteria for determining the subset of the data in the form of a script specifying the database queries.

The table selection module 220 identifies 320 a set of N largest tables of source database. The table selection module 220 may determine the sizes of the tables based on the number of records in each table. Alternatively, table selection module 220 may determine the sizes of the tables based on the amount of data stored in each table.

The tablespace manager 260 creates 330 a new table space for storing the set of the N largest tables. The tablespace manager 260 transfers the set of N largest tables to the new table space. The tablespace manager 260 creates one or more files for storing the data for the new table space. The tablespace manager 260 copies the data of the set of N largest to the files of the new table space.

The file copy module 230 identifies 340 files of the source database other than the files of the new tablespace created. These files store tables other that the set of N largest tables (in other words, these files store the smaller tables of the database.) The file copy module 230 copies 350 the set of files storing the smaller tables to the target system 105. The copy 350 of the set of files is performed without invoking any database queries of the database system 150. As a result, the copy of the files is a fast operation as compared to a process that transfers data of the tables stored in the set of files using the database system 150.

The data subsetting module 120 sends instructions to start 360 the database system 150b on the target system 105. In an embodiment, the data subsetting module 120 provides an indication to a system administrator that database system 150b needs to be started and waits for the system administrator to start the database system 150b on the target system 105. Alternatively, the data subsetting module 120 remotely executes a script on the target system 105 to start the database system 150b. Once database system 150b is started, the database system 150b can execute database commands including SQL statements, for example, to populate data of the database tables of database system 150b. For example, the database system 150b can execute insert commands to insert records in database tables.

The export module 240 determines 370 the subset of data of the top tables based on the criteria specified in the request to export. For example, if the request to export provides database queries for determining subsets of tables of database system 150a, the export module 240 invokes query processor 250 to execute these database queries. The export module 240 exports 380 the subset of data determined 370 to the target system 105.

In some embodiments, the data subsetting module 120 further transfers data associated with the database application 130a to the target system 105. The data subsetting module 120 identifies one or more application files associated with the database application 130a and stored on the file system of the source system 100. These include executable files of the database application 130a, configuration files of the database application 130a, and any other files used to store data outside the database system 150a. The data subsetting module 120 transfers the identified files of the database application 130a to the target system 105, for example, by invoking the file copy module 230.

In an embodiment, the data subsetting module 120 further invokes one or more scripts on the target system 105 for modifying the configuration files of the database application 130b on the target system 105 so as to reconfigure the database application 130b to use the database system 150b. The target system 105 receives instructions to start the database application 130b. The database application 130b starts executing using the database system 150b of the target system 105. The target system 105 can be used by developers or testers to work with the database application 130b and the database system 150b and use the subset of data exported to the database system 150b, for example, for testing and debugging.

Embodiments described herein illustrate concepts using a relational database, however other embodiments may use other types of databases, for example, object-oriented databases, deductive databases, graph databases, and so on. The techniques described herein can be applied to the databases if the database provides a mechanism to associate the system files with the database objects stored in the system files. Furthermore, the database should support some mechanism to determine a subset of data stored in database objects, for example, certain type of query language. Accordingly, the data subsetting module 120 can determine which database objects to be exported using the file copy mechanism and which database objects to be exported via the database by determining a subset of data for exporting.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for exporting a subset of data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for exporting a subset of a database, the method comprising:
receiving a request to export a subset of data of a source database from a source system to a target database in a target system, the request specifying a criterion for determining the subset, the subset of data being represented in a plurality of tables, the plurality of tables being stored in a plurality of files within the source system;
dividing the plurality of tables into a first set of tables and a second set of tables;
exporting the first set of tables to the target system by identifying one or more files in the plurality of files that store the first set of tables and transferring the one or more files to the target database in the target system by performing a file copy operation of the source system; and
exporting a portion of the subset of data represented in the second set of tables to the target system by executing one or more database queries on the second set of tables based on the criterion and transferring the portion of the subset of data represented in the second set of tables to the target database, wherein the second set of tables comprises each of the plurality of tables except the tables comprising the first set of tables.

2. The method of claim 1, wherein the second set of tables comprises a fixed number of largest database tables of the source database.

3. The method of claim 1, further comprising:
creating a new table space in the source database; and
transferring the second set of tables to the new table space.

4. The method of claim 3, wherein identifying one or more files in the plurality of files that store the first set of tables comprises:
identifying a file storing data of the new table space; and
selecting files storing data of the source database other than the identified file.

5. The method of claim 1, wherein the file copy operation is performed by executing an operating system command to transfer files on the source system.

6. The method of claim 1, wherein the file copy operation is performed without invoking a database query of the source database.

7. The method of claim 1, wherein the source database system is associated with an application, the method further comprising:
identifying one or more application files stored on the source system, the one or more files storing information associated with the application; and
copying the one or more application files to the target system.

8. The method of claim 7, further comprising:
invoking one or more scripts to modify the application files to configure the application on the target system to use the target database.

9. The method of claim 1, wherein dividing the plurality of tables into a first set of tables and a second set of tables comprises:
assigning any tables in the plurality of tables for which a computational cost associated with executing the one or more database queries exceeds a computational cost associated with performing a file copy operation to the first set of tables; and
assigning any remaining tables in the plurality of tables to the second set of tables.

10. The method of claim 9, wherein the score of a table is based on at least one of: a size of data stored in the table, how frequently the table is accessed, how frequently the table is updated, or a measure of significance of the table supplied by an administrator.

11. The method of claim 1, wherein the number of tables in the second set of tables is less than the number of tables in the first set of tables.

12. At least one non-transitory computer-readable medium storing computer-readable instructions that, when executed by one or more computing devices, cause at least one of the one or more computing devices to:
receive a request to export a subset of data of a source database from a source system to a target database in a target system, the request specifying a criterion for determining the subset, the subset of data being represented in a plurality of tables, the plurality of tables being stored in a plurality of files within the source system;
divide the plurality of tables into a first set of tables and a second set of tables;
export the first set of tables to the target system by identifying one or more files in the plurality of files that store the first set of tables and transferring the one or more files to the target database in the target system by performing a file copy operation of the source system; and export a portion of the subset of data represented in the second set of tables to the target system by executing one or more database queries on the second set of tables based on the criterion and transferring the portion of the subset of data represented in the second set of tables to the target database, wherein the second set of tables comprises each of the plurality of tables except the tables comprising the first set of tables.

13. The at least one non-transitory computer-readable medium of claim 12, wherein the second set of tables comprises a fixed number of largest database tables of the source database.

14. The at least one non-transitory computer-readable medium of claim 12, further storing computer-readable instructions that, when executed by at least one of the one or more computing devices, cause at least one of the one or more computing devices to:

creating a new table space in the source database; and
transferring the second set of tables to the new table space.

15. The at least one non-transitory computer-readable medium of claim 14, wherein the instructions that, when executed by at least one of the one or more computing devices, cause at least one of the one or more computing devices to identify one or more files in the plurality of files that store the first set of tables further cause at least one of the one or more computing devices to:

identifying a file storing data of the new table space; and
selecting files storing data of the source database other than the identified file.

16. The at least one non-transitory computer-readable medium of claim 12, wherein the file copy operation is performed by executing an operating system command to transfer files on the source system.

17. The at least one non-transitory computer-readable medium of claim 12, wherein the file copy operation is performed without invoking a database query of the source database.

18. The at least one non-transitory computer-readable medium of claim 12, wherein the source database system is associated with an application, further storing computer-readable instructions that, when executed by at least one of the one or more computing devices, cause at least one of the one or more computing devices to:

identifying one or more application files stored on the file system of the source database, the one or more files storing information associated with the application; and
copying the one or more application files to the target system.

19. The at least one non-transitory computer-readable medium of claim 18, further storing computer-readable instructions that, when executed by at least one of the one or more computing devices, cause at least one of the one or more computing devices to:

invoking one or more scripts to modify the application files to configure the application on the target system to use the target database.

20. A computer-implemented system for exporting a subset of a database, the system comprising:

one or more processors; and
one or more memories operatively coupled to at least one of the one or more processors and having instructions stored thereon that, when executed by at least one of the one or more processors, cause at least one of the one or more processors to:

receive a request to export a subset of data of a source database from a source system to a target database in a target system, the request specifying a criterion for determining the subset, the subset of data being represented in a plurality of tables, the plurality of tables being stored in a plurality of files within the source system;

divide the plurality of tables into a first set of tables and a second set of tables;

export the first set of tables to the target system by identifying one or more files in the plurality of files that store the first set of tables and transferring the one or more files to the target database in the target system by performing a file copy operation of the source system; and export a portion of the subset of data represented in the second set of tables to the target system by executing one or more database queries on the second set of tables based on the criterion and transferring the portion of the subset of data represented in the second set of tables to the target database, wherein the second set of tables comprises each of the plurality of tables except the tables comprising the first set of tables.

* * * * *